United States Patent
Li

(10) Patent No.: US 8,306,262 B2
(45) Date of Patent: Nov. 6, 2012

(54) FACE TRACKING METHOD FOR ELECTRONIC CAMERA DEVICE

(75) Inventor: Shu Li, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 1210 days.

(21) Appl. No.: 12/153,195

(22) Filed: May 15, 2008

(65) Prior Publication Data

US 2009/0285488 A1 Nov. 19, 2009

(51) Int. Cl.
*G06K 9/00* (2006.01)

(52) U.S. Cl. ........ 382/103; 382/165; 382/170; 382/195; 382/224; 382/262

(58) Field of Classification Search .................. 382/103, 382/118, 165, 170, 195, 224, 262, 264, 286, 382/291

See application file for complete search history.

(56) References Cited

U.S. PATENT DOCUMENTS

| 6,297,846 B1* | 10/2001 | Edanami ...................... 348/239 |
| 2005/0074167 A1* | 4/2005 | Maeda et al. .................. 382/190 |
| 2005/0265603 A1* | 12/2005 | Porter et al. ................... 382/190 |
| 2006/0204055 A1* | 9/2006 | Steinberg et al. ............. 382/118 |
| 2007/0183661 A1* | 8/2007 | El-Maleh et al. ............. 382/173 |

* cited by examiner

*Primary Examiner* — Phuoc Tran
(74) *Attorney, Agent, or Firm* — Bacon & Thomas, PLLC

(57) ABSTRACT

The present invention discloses a face tracking method for electronic camera devices. The method is applied to an electronic camera device having a face database and a face classifier, and the face database is provided for storing data such as a position, a size and a skin color prototype of a face in a previously stored preview image, and the method includes the steps of: obtaining a current preview image; determining whether or not a known face exists in the face database; defining a searching space on the current preview image; and using the face classifier to detect the searching space in the current preview image, and determining whether or not a face exists in the searching space.

8 Claims, 6 Drawing Sheets

FACE TRACKING METHOD FOR ELECTRONIC CAMERA DEVICE

FIELD OF THE INVENTION

The present invention relates to a face tracking method, and more particularly to a face tracking method for an electronic camera device having a face database storing data including face position, size and skin color prototype (such as color histogram) of previously stored preview images, which enables the electronic camera device to define a searching space according to the data of known face stored in the face database when a current preview image is obtained, and then detect and track the searching space for the precise position of the face in the current preview image accurately, so as to effectively reduce the large number of operations required for the detection and tracking processes, and greatly enhance the speed and efficiency of the face tracking.

BACKGROUND OF THE INVENTION

In recent years, digital imaging technology advances day after day, and various different electronic devices (such as digital cameras, digital camcorders, notebook computers and mobile phones) having digital imaging devices (such as CCD and CMOS) are introduced to the market, not only providing increasingly higher imaging quality and smaller size, but also offering an increasingly lower price, and thus these electronic devices become popular. Although many digital electronic camera devices come with advanced functions including auto focus and auto exposure, the electronic camera devices determine a captured image by a sensed scene according to the information of the captured image, wherein a face only occupies a small portion of the whole scene, and thus it is difficult for a photography novice to capture a satisfactory portrait due to the user's lack of ability and experience of adjusting the shutter and diaphragm correctly. Thus, it is an important subject for manufacturers and designer to develop different electronic camera devices having intelligent functions to meet the consumer requirement of the basic photography, compensate their insufficient photographic techniques, and effectively save the long adjusting time or simplify the procedure to shoot high-quality portraits.

To provide consumers an intelligent imaging function of the electronic camera device to shoot high-quality portraits, some manufacturers have applied a face detection technology to the electronic camera devices, and many face detection algorithms have been disclosed in technical papers and bulletins, and the most popular face detector is based on the Gentle Adaboost (GAB) algorithm, and the face detector uses a Haar-like feature to identify a face, and also uses a specific quantity of face pattern samples to train a required face classifier, and determines whether or not an image of a scene is a face, so that the face in the scene can be detected or identified quickly. In a traditional GAB algorithm, the rules of operation are listed in the table below:

A stage of Haar feature classifier construction using GAB

1. Start with weights $w_i = 1/2p$ and $1/2l$ where p and l are the number of positive and negative class samples.
2. Repeat for m = 1, 2, . . . , M.
   (a) For each Haar feature j, $f_m(x) = P_w(y=1|x) - P_w(y=-1|x)$ using only the feature j values.
   (b) Choose the best feature confidence set of values $f_m(x)$ giving the minimum weighted error $e_m = Ew[1_{(y_i \neq sign[f_m(x_i)])}]$ for all A stage of Haar feature classifier construction using GAB feature j.
(c) Update $F(x) \leftarrow F(x) + f_m(x)$
(d) Set $w_i \leftarrow w_i \exp[-y_i \cdot f_m(x_i)]$, i = 1, 2, . . . , N., and renormalize so that $\Sigma w_i = 1$.

3. Output the classifier sign $[F(x)] = \text{sign}\left[\sum_{m=1}^{M} f_m(x)\right]$.

The GAB algorithm selects the best Haar feature of a minimum weighted error em from all features. For each weak classifier $f_m(x)$, the GAB algorithm selects a feature j to minimize the error function by Formula (1):

$$f_m(x) = \arg\min_j \left\{ \sum_i w_i * v_i \right\} \quad (1)$$

where, $$v_i = \begin{cases} 1 \text{ represents} - \text{missclassified} \\ 0 \text{ represents} - \text{others} \end{cases}, w_i$$

is a sample weight.

From the list above and Formula (1), although the GAB algorithm can update each stage classifier in each loop of the iteration by using a confidence-rated real value, the misclassification error defined in the GAB algorithm is discrete. In Formula (1), $v_i$ is a Boolean variable, and $v_i$ is equal to 1 for a misclassification, and 0 for a classification. Similarly, a weak classifier with a binary output in the discrete Adaboost algorithm does not mean that the Haar-like features are in a good distribution, and thus the misclassification error defined in the aforementioned algorithm cannot describe the distribution of the misclassification errors accurately.

In view of the description above, the inventor of the present invention redefined the misclassification error em of the GAB algorithm in his related patent application as shown in Formula (2) below:

$$e_m = \sum_i w_i * v_i = \sum_i w_i * (y_i - f_m(x_i)) \quad (2)$$

where, $v_i$ is the distance between the confidence-rated real value and the expected class label. According to a journal "Face Detection Using Look-up Table Based Gentle Adaboost" authored by Cem Demirkir and Bülent Sankur and published in the Audio- and Video-based Biometric Person Authentication on July, 2005, if $f_m(x_i)$ varies within the range of [−1,1], $v_i$ is a real variable distributed within the range of [−2,2], and the definition uses a confidence form to describe the misclassification error, and uses a histogram bin in the computer programming to compute the misclassification error. For example, two histogram bins as shown in FIG. 1 are provided to show the difference between two types of definitions, wherein positive samples of the histogram bins have different distributions on the features i and j. For simplicity, the positive samples have the same distribution as the negative samples. If Formula (1) is used, the resultant error summations of the two types of feature spaces are the same, but if Formula (2) is used, the resultant error summation of feature j will be smaller than the computed result of the feature I. As to a greedy searching scheme, the feature j will be selected for building a weak classifier. According to the definition of the weak classifier function, if samples in a histogram bin are difficult to be separated, then the output confidence value is close to zero, or else the output confidence value is close to 1 or −1. This result shows that the output confidence value of the feature j is much greater than the output confidence value of the feature i. In the two histogram bins as shown in FIG. 1, the sample in the histogram bin space of the feature j is easier to be separated than the sample in the histogram bin space of the feature i, so that the confidence-rated definition of the misclassification error becomes more reasonable.

Traditionally, a Haar-like feature is defined in a way that, four basic units (as shown in FIG. 2) in a feature pool are provided for detecting a feature prototype of an object in an image window, wherein the prototype 10, 11 represents an edge feature; the prototype 12 represents a line feature; the prototype 13 represents a special diagonal line feature; the black region represents a negative weight; and a white region represents a positive weight. However, the inventor of the present invention attempts to provide separate samples in histogram bins easier based on the definition of the foregoing algorithm by using eight basic units (as shown in FIG. 3) in a feature pool for detecting a feature prototype of an object in an image window when the Haar-like feature is defined, and such feature prototype is called an extended Haar feature. The feature prototype 20, 21 represents an edge feature, wherein the black region represents a negative weight; the white region represents a positive weight; and the black region and the white region are distributed on the same horizontal or vertical line, but a specific distance is maintained between the black and white regions. The feature prototype 22, 23 represents an edge feature, wherein the black region represents a negative weight; the white region represents a positive weight; the black region and the white region are intersected perpendicularly with each other. The feature prototype 24, 25 represents a line feature prototype, wherein the black region represents a negative weight; the white region represents a positive weight; and the black region and the white region are intersected diagonally with each other. The prototype 26, 27 represents a special diagonal line feature, wherein the black region represents a negative weight; the white region represents a positive weight; and ¼ of the area of the black region and the white region is overlapped along their diagonals.

Although the foregoing definition of the extended Haar feature can separate samples in the histogram bin easier, but the inventor of the present invention also takes the following conditions into consideration for detecting and identifying a face in a preview image:

1. To detect a newly present unknown face in a current frame and an unknown face that is not detected in a previous frame, it is necessary to complete a detecting process for the whole image.

2. To complete the detecting process for the whole image, a large computing value slows down the processing speed.

3. Due to the complexity of the photographic environment, non-face patterns can be rejected accurately when the face in an image is detected.

4. When variable factors including pose, expression and illumination are taken into consideration, the known face detected in the previous frame by a face detector cannot be too stringent.

From the description above, Cases 1 and 2 are contradictive to each other. An image of 120×160 pixels is taken for example. Traditionally, ten searching windows of different sizes are provided for a face detector to search for any face in each preview image, and the sizes of the searching windows are searched one by one along the horizontal and vertical directions. The faces are searched by an iteration of moving horizontally and vertically on the whole image, and thus the number of operations in the detecting process is very large, and the speed and efficiency of the face detection become very low. Obviously, the prior art cannot meet the consumer requirements.

SUMMARY OF THE INVENTION

In view of the foregoing shortcomings of the prior art wherein the speed and efficiency of a face detection are very low in the process for a face detector of electronic camera devices to search a face in each preview image, the inventor of the present invention based on years of experience to conduct extensive researches and experiments, and finally developed a face tracking method for electronic camera device to reduce a large number of operations during the face detection and tracking processes, so as to enhance the speed and efficiency of the face detection and tracking process effectively.

Therefore, it is a primary objective of the present invention is to provide a method applied to an electronic camera device, and the method comprises the steps of: obtaining a preview image of the electronic camera device; performing a face tracking, wherein the electronic camera device has a face database for storing data including face position, size and skin color prototype (such as color histogram) of the preview image; obtaining a skin color extraction information according to the data including the position, size and skin color prototype of the known face in the face database to define a searching space, when a current preview image is obtained by the method and an existing known face in the face database is determined; using a preinstalled face classifier for the detection of a searching space in the current preview image to determine whether or not a face exists in the searching space; and automatically updating the corresponding face data in the face database when each face is detected. If a known face exists in the face database, the electronic camera device simply needs to detect the searching space to detect and locate the precise position of the face in the current preview image accurately, so as to enhance the speed and efficiency of the face tracking greatly.

Another objective of the present invention is to start a face tracking mechanism to define an extended searching region according to the data including a position, a size and a skin color prototype of a known face in the face database to track a corresponding face in the preview image, when the face classifier cannot detect a face in the searching space, and calculate a color histogram of each position in the current searching region and a color histogram matching of the corresponding known face, and use the detected data of a corresponding position having the maximum histogram matching of a face data in the current preview image to automatically update the corresponding face data in the face database, so as to effectively reduce the large number of operations required for the detection and tracking processes, greatly enhance the speed and efficiency of the face tracking, and accurately track the face in the current preview image.

A further objective of the present invention is to thoroughly search the position and size of each skin color extraction area in a current preview image when it is determined that no known face exists in the face database, and then use a face classifier to detect each skin color extraction area in the current preview image to determine whether or not there is a face in the skin color extraction area. If a face is detected, the corresponding face data in the face database is updated automatically, so that it is only necessary to detect each skin color extraction area in the current preview image of the electronic camera device, if there is no known face in the face database, so as to effectively reduce the large number of operations required for the detecting process and greatly enhance the speed and efficiency of the face tracking.

Another objective of the present invention is to label a face rectangle of the face position and size for a stabilizing process when each face is detected, in order to effectively prevent a screen dithering of the face rectangle of the electronic camera device, enhance the visual effect, and precisely locate the exact position of the face in the current preview image.

To make it easier for our examiner to understand the objective, technical characteristics and effects of the present invention, preferred embodiments will be described with accompanying drawings as follows:

DETAILED DESCRIPTION OF THE PREFERRED EMBODIMENTS

Figure 1:
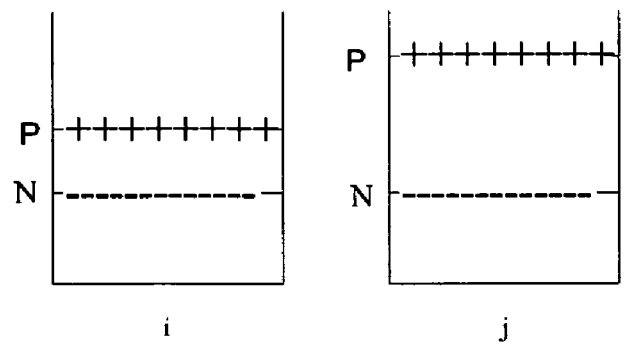
FIG. 1 is a schematic view of calculating a distribution of misclassification error of features i and j by a traditional histogram bin method.
Figure 2:
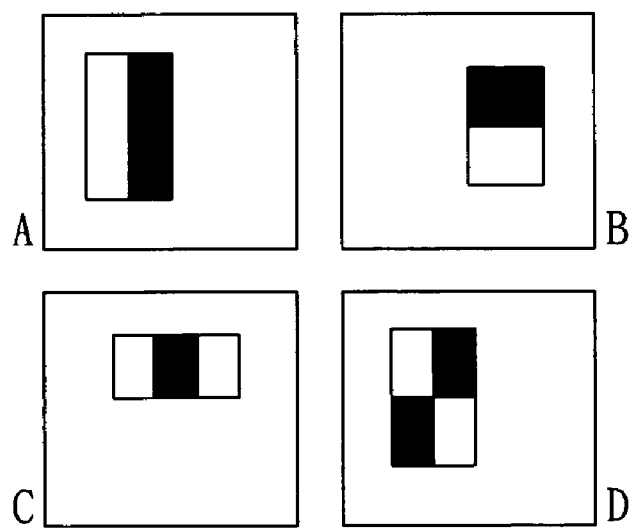
FIG. 2 is a schematic view of four basic units used for defining a feature prototype in a traditional Haar-like feature.
Figure 3:
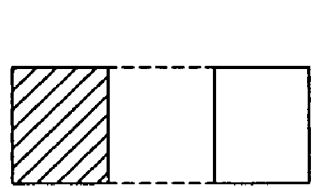
FIG. 3 is a schematic view of eight basic units used by the inventor of the present invention for defining a feature prototype in his previous related patent application.
Figure 3:
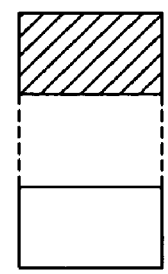
Figure 3:
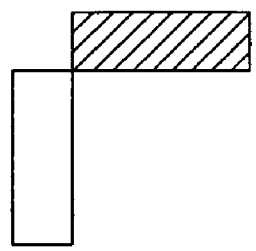
Figure 3:
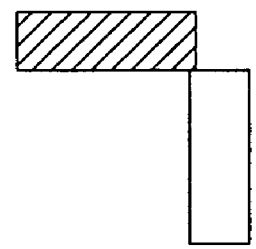
Figure 3:
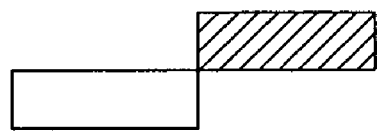
Figure 3:
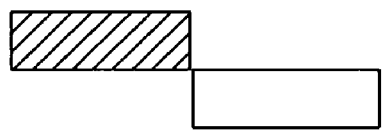
Figure 3:
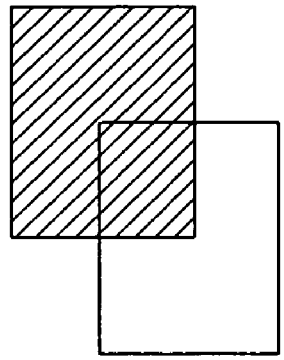
Figure 3:
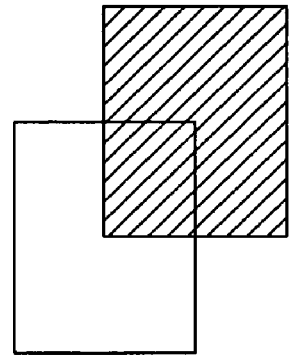
Figure 4:
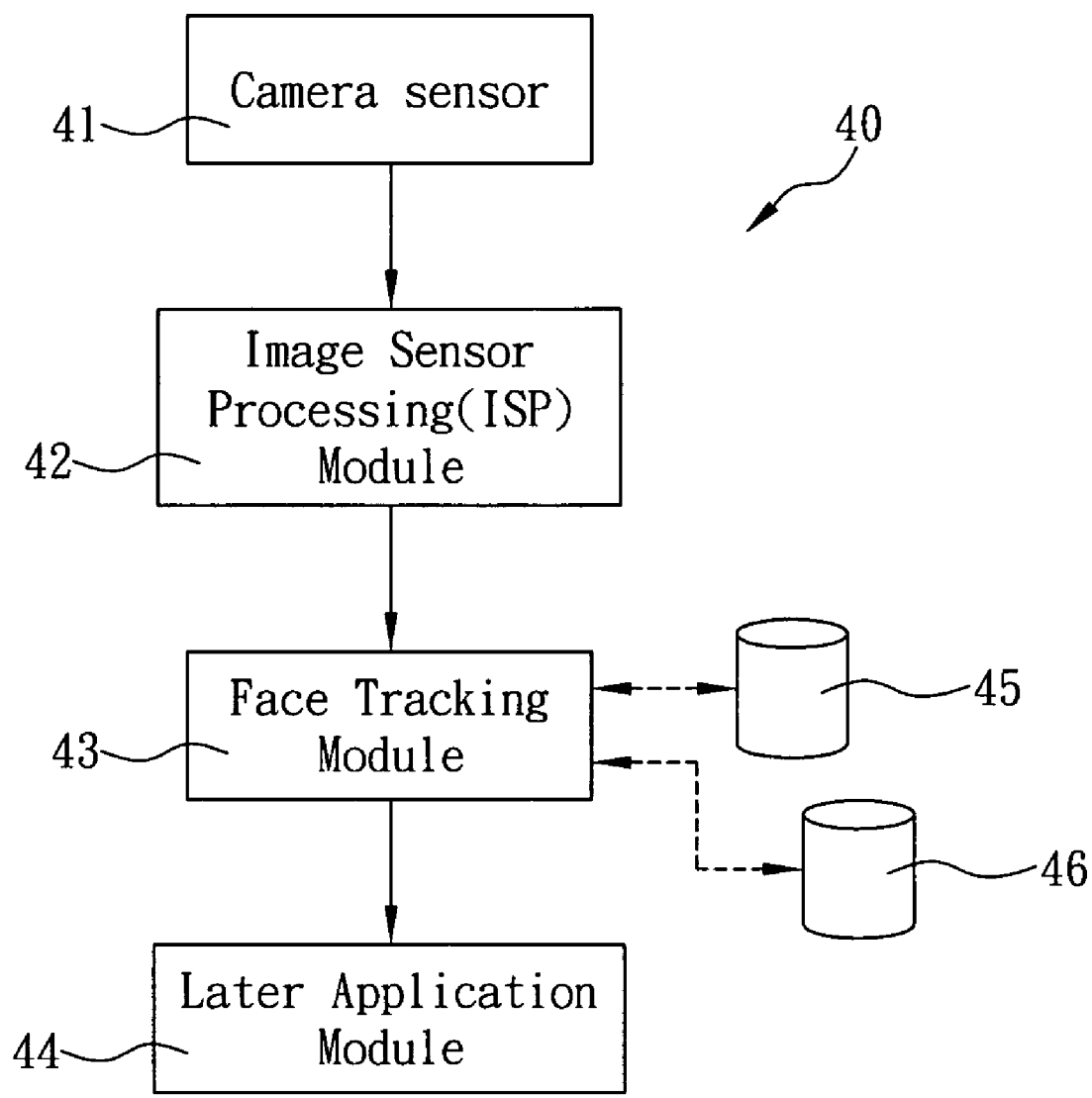
FIG. 4 is a schematic view of a system architecture of an electronic camera device in accordance with the present invention.

Referring to FIG. 4 for a face tracking method for electronic camera device, the method is applied to an electronic camera device, and the electronic camera device 40 comprises a camera sensor 41, a processing module 42, a face tracking module 43 and an application module 44. The camera sensor 41 is an optical sensing module of the electronic camera device 40 for converting a captured optical signal into an electric signal, and the camera sensor 41 is mainly divided into two types respectively CMOS and CCD. The processing module 42 is installed at an end of the camera sensor 41 for performing a pre-processing including sampling, white balance and color space conversion of an image signal transmitted from the camera sensor 41 to produce a preview image. The face tracking module 43 processes the face detection and tracking for the preview image transmitted from the processing module 42 to obtain the data including face position, size and skin color prototype of the preview image, wherein the skin color prototype can be a color histogram, and the color histogram shows the color statistics of a YUV channel corresponding to the face position and size of the preview image. The application module 44 receives the data including the face position, size and skin color prototype transmitted from the face tracking module 43, and performs applications and processes mainly including auto focus, color enhancement and white balance adjustment according to the preview image transmitted from the processing module 42 and different user requirements. In the present invention, the face tracking module 43 is improved, so that when the electronic camera device tracks a face in the preview image, the tracking can be performed more quickly and precisely to locate the exact position of the face in the current preview image. Since the components including the camera sensor 41, processing module 42 and application module 44 are prior arts, and thus will not be described in details here.

Figure 5:
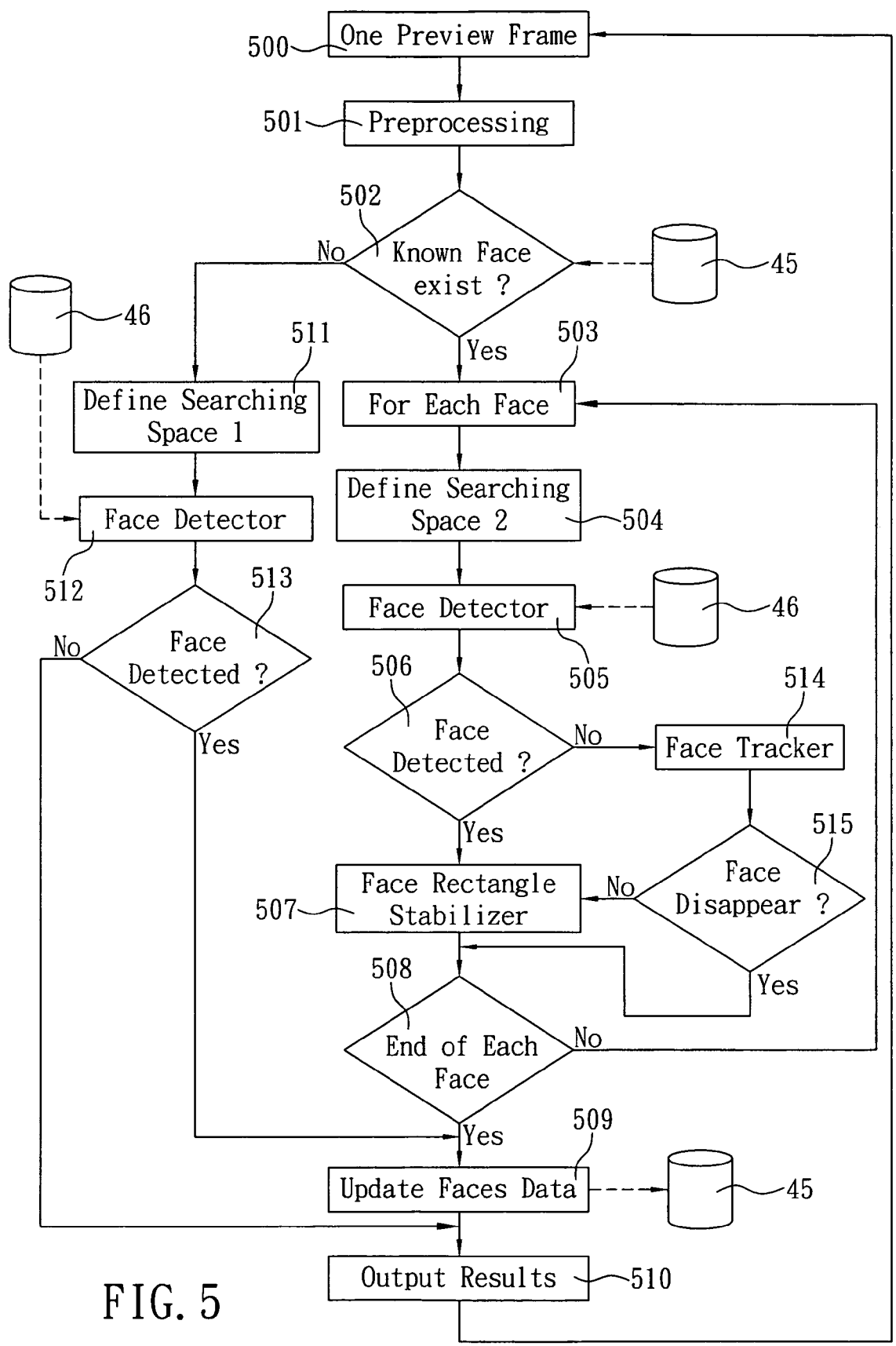
FIG. 5 is a flow chart of a face tracking module in accordance with a preferred embodiment of the present invention.

Referring to FIG. 4 for a preferred embodiment of the present invention, the electronic camera device 40 further comprises a face database 45 and a face classifier 46, wherein if the face tracking module 43 detects and determines that there is a face in the current preview image, the data including the face position, size and skin color prototype in the current preview image will be stored into the face database 45 as a reference data for performing a face tracking for the next preview image. The face tracking module 43 uses a face classifier 46 to detect the current preview image and determine whether or not to read the data including the position, size and skin color prototype of a face if the face exists in the current preview image. In the preferred embodiment, if the electronic camera device obtains a current preview image, the face tracking module 43 performs the detection and tracking to a face in the current preview image according to the following procedure as shown in FIG. 5:

Step (500): Read a current preview image, wherein the preview image can be in a YUV or RGB format, and this embodiment adopts the YUV format for the illustration, but the invention is not limited to the YUV format only.

Step (501): Perform a pre-processing including resize, color space transform and skin color extraction to the preview image, wherein the resize is provided for reducing the preview image to a size of 160×120 pixels; the color space transform is provided for converting the YUV pixel format into the YUV 411 planar format; and the skin color extraction is provided to obtain the skin color extraction in the preview image according to the skin color prototype disclosed in the inventor's other patent (U.S. patent application Ser. No. 11/323,653). Since the skin color extraction is not the key point of the present invention, the skin color extraction will not be described in details here.

Step (502): Determine whether or not there is a data such as a position, a size and a skin color prototype of the known face in the face database 45; if yes, then go to Step (503) to perform an iteration of detecting each face in the preview image according to the face data in the face database 45, or else go to Step (511) to define a first searching space of the preview image.

Step (503): Read a data including the position, size and skin color prototype of a known face in the face database 45.

Step (504): Define a second searching space for the preview image according to the read data including the position, size and skin color prototype of a known face, and the method is based the method disclosed and defined by the inventor's other patent (such as U.S. patent application Ser. No. 11/545,423). Since the method of defining the second searching space is not the key point of the present invention and thus will not be described in details here.

Step (505): Search each position, size and skin color prototype of the second searching space in the preview image.

Step (506): Use the face classifier 46 to determine whether or not a face in the second searching space is detected; if yes, then go to Step (507), or else go to Step (514) to track the corresponding face in the preview image.

Figure 6:
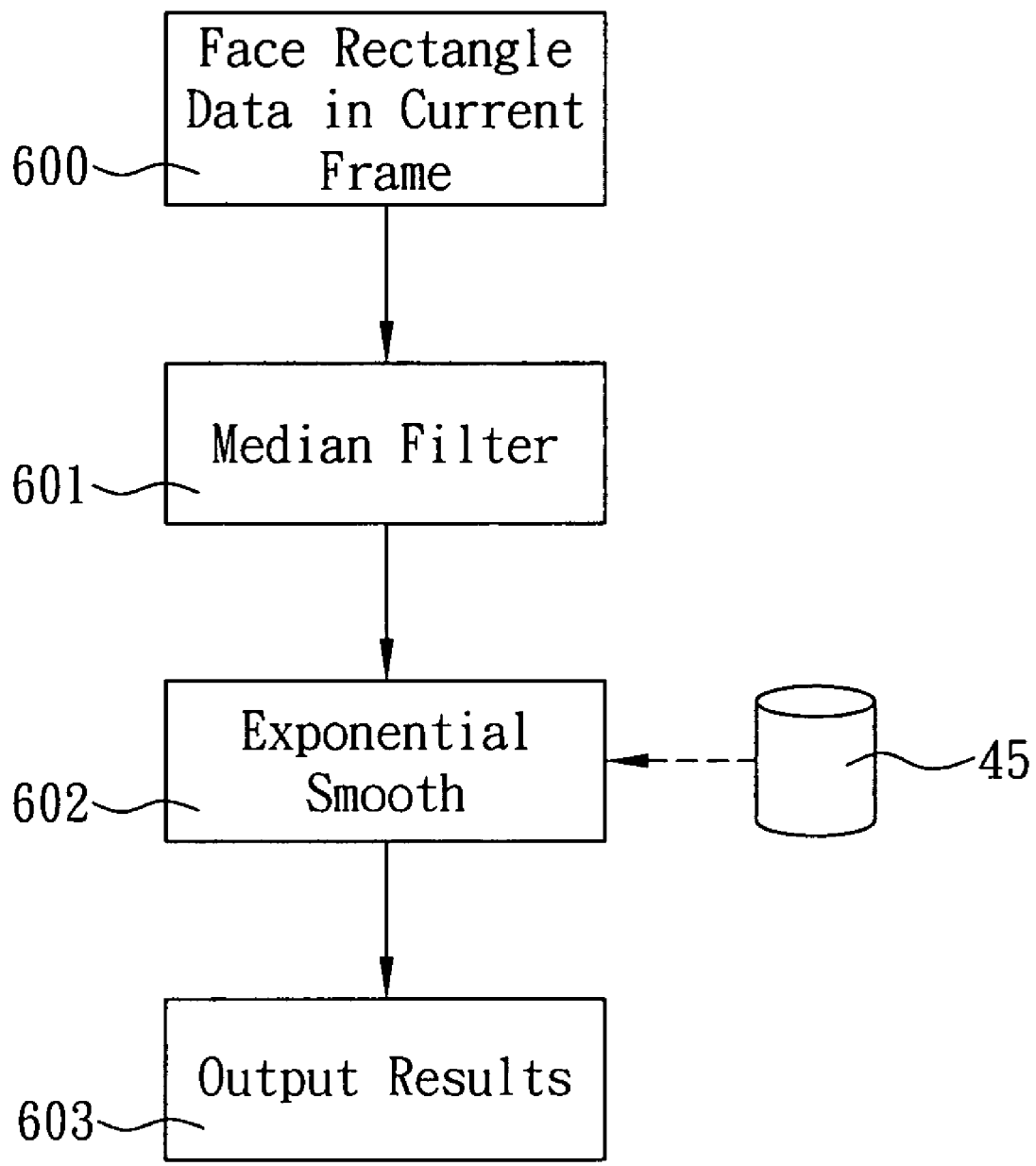
FIG. 6 is a flow chart of stabilizing a face rectangle in accordance to the preferred embodiment as shown in FIG. 5.

Step (507): Since the position and size of a face rectangle (for labeling the face position and size in a screen) detected or tracked each time vary, a screen dithering frequently occurs in the face rectangle of the electronic camera device. To prevent the dithering occurred at the face rectangle on a screen, a stabilizing process is performed to the face rectangle to enhance the visual effect if a face is detected, and the exact position of the face in the current preview image is located. In this preferred embodiment, the face tracking module 43 processes a procedure as shown in FIG. 6 to stabilize the size and position of the face rectangle:

Step (600): Read the position and size information ($x_i, y_i, w_i, h_i$) of the face rectangles in the recent 3 preview images from the face database 45, wherein x, y represent the coordinates of a position; w represents the width; and h represents the height; and i=1,2,3. The aforementioned conditions are used in this embodiment, but the invention may use another number of preview images as required.

Step (601): Perform a median filtering to the position and size information of the face rectangles in the recent 3 preview images.

Step (602): Perform an exponential smooth process to the history data ($x_i, y_i, w_i, h_i$) of the position and size of the known face in the median filtered result and the face database 45.

Step (603): Label the median filtered and exponential smoothed face rectangle at a corresponding face position on the screen to enhance the visual effect, and precisely locate the exact position of the face in the current preview image.

Step (508): Determine whether or not the read known face is the last known face in the face database 45; if yes, then end the iteration of the face detection and go to Step (509), or else return to Step (503).

(509) Write the detected face position, size and skin color prototype (which is a color histogram) into the face database 45 to update the data including the position, size and skin color prototype of the known face in the face database 45.

Step (510): Output the data including the position, size and skin color prototype of the detected face to the application module 44, such that the application module 44 process an application such as an auto focus, a color enhancement and a white balance adjustment to the current preview image according to the data and user requirements.

Step (511): Thoroughly search the preview images, and define each skin color extraction area of the preview image as the first searching space.

Step (512): Search the data including each position, size and skin color prototype of the first searching space in the preview image.

Step (513): Use the face classifier 46 to determine whether or not a face is detected in the first searching space; if yes, then go to Step (509), or else go to Step (510).

Figure 7:
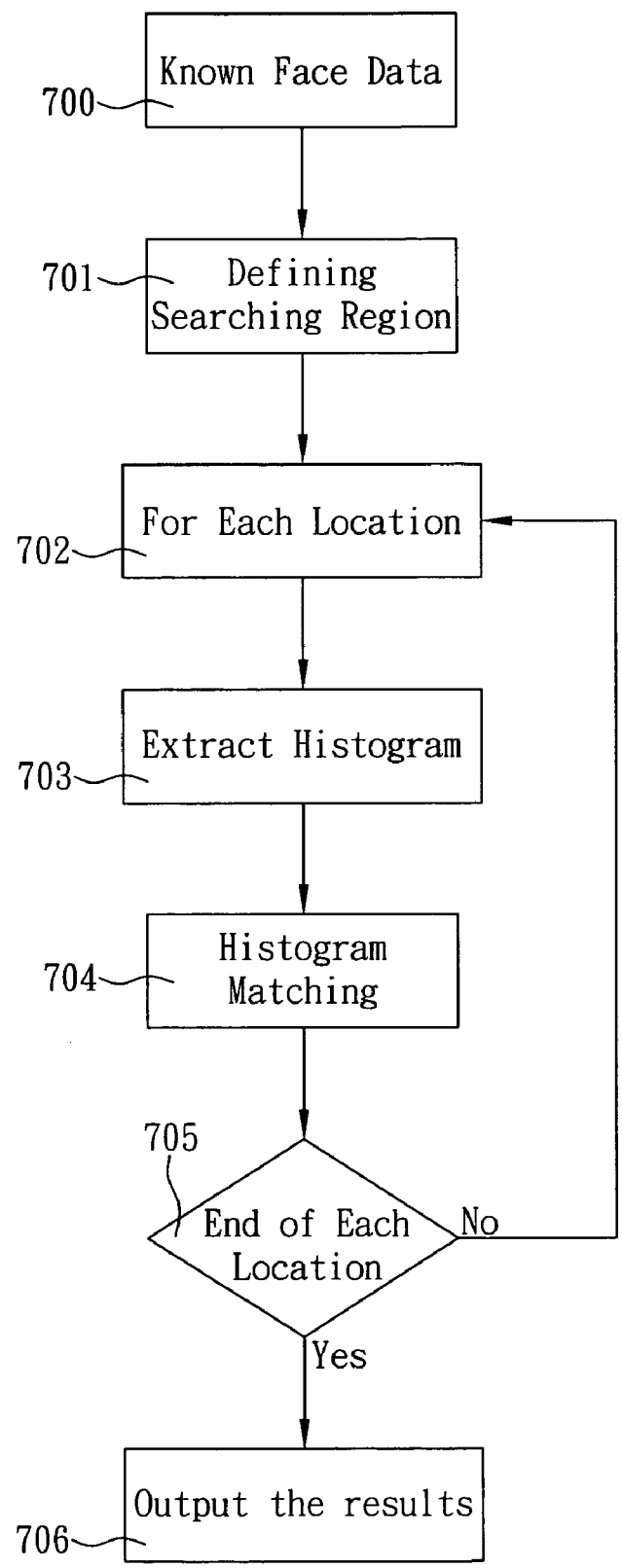
FIG. 7 is a flow chart of a tracking face in accordance to the preferred embodiment as shown in FIG. 5.

Step (514): Start a face tracking mechanism and perform a face tracking according to the data including the position, size and skin color prototype of the known face in the face database 45. In this embodiment, the face tracking module 43 processes the following procedure as shown in FIG. 7 to stabilize the size and position of the face rectangle:

Step (700): Read the data including the position, size and skin color prototype of the known face in the face database 45, wherein the skin color prototype is represented by color histogram information $h_T(i)$; the color histogram shows the color statistics of the corresponding YUV channel of the face position and size on the preview image. In this embodiment, each of the three channels of the YUV is divided into 16 regions of the grey levels from 0 to 265, so that the 3D spaces of the YUV can be divided into 16×16×16 subspaces, and each subspace corresponds to an element in the histogram.

Step (701): Define a face searching region. Assumed that a specific continuity exists between two adjacent preview images of the preferred embodiment, the size of the known face in the face database 45, and the width w and the height h are doubled, and the required searching region S is defined as follows:

$$S=(x,y,2w,2h)$$

Step (702): Perform an iteration of searching a face for each position of each searching region.

Step (703): Obtain a color histogram $h_1(i)$ at the current position to obtain a 16×16×16 dimensional vector.

Step (704): Calculate a histogram matching $\rho(h_T, h_1)$ between a color histogram $h_1(i)$ of a current position and a color histogram $h_T(i)$ of a corresponding known face in the face database 45 by the following formula:

$$\rho(h_T, h_1) = \sum_{i=1}^{N} \text{abs}(h_T(i) - h_1(i))$$

where, N is the dimension of the histogram, and $h_T(i)$ and $h_1(i)$ are a histogram of the corresponding known face in the face database 45 and a histogram of a position searched by the face tracker respectively, and the two histograms are unified as follows:

$$\int h_T(i)di=1 \text{ and } \int h_1(i)di=1$$

If the histogram matching of the two histograms satisfies the condition $\rho(h_T, h_1) > 0.5$, then the face is tracked, or else no face is tracked and the current tracking result is discarded.

Step (705): Determine whether or not the read known face is the last known face in the face database 45; if yes, then end the iteration of searching a face and go to Step (706), or else return to Step (702).

Step (706): Output the corresponding detected position information having the maximum histogram matching to the face tracking module 43, so that the face tracking module 43 can accurately track a face in the current preview image.

Step (515): Determine whether or not the tracked face in the current preview image disappears; if yes, then go to Step (508) to process the iteration of tracking the next face, or else go to Step (507) to stabilize the face rectangle.

When the present invention tracks a face of a preview image obtained by the electronic camera device, a different method is adopted to define a different searching space according to the determination whether or not a known face exists in the face database, and the face classifier is used for detecting a searching space in the current preview image to determine whether or not a face exists in the searching space. If the face classifier cannot detect a face in the searching space, a face tracking mechanism is started to define an extended searching region according to the data including the position, size and skin color prototype of the known face in the face database, and track a corresponding face in the preview image. When each face is detected, the corresponding face data in the face database is updated automatically, such that the electronic camera device needs to detect each skin color extraction area in the current preview image, only if there is no known face in the face database, and such arrangement can effectively reduce the large number of operations required for the detection and tracking processes, so as to greatly enhance the speed and efficiency of the face detection and tracking processes, and precisely locate the exact position of the tracked and fixed face in the current preview image, and the electronic camera device can achieve the advanced functions such as auto focus and auto exposure for shooting high-quality portraits quickly and accurately.

While the invention has been described by means of specific embodiments, numerous modifications and variations could be made thereto by those skilled in the art without departing from the scope and spirit of the invention set forth in the claims.

What is claimed is:

1. A face tracking method for electronic camera devices, which is applied to an electronic camera device having a face database and a face classifier therein, wherein the face database is provided for storing data including face position, size and skin color prototype of a previously stored preview image, comprising the steps of:
obtaining a current preview image;
determining whether or not a known face exists in the face database;
defining a searching space on the current preview image;
using the face classifier to detect the searching space in the current preview image, and determining whether or not a face exists in the searching space;
obtaining a skin color extraction information to define the searching space, when the face database is determined to have a known face, according to the data including a position, a size and a skin color prototype of the known face in the face database;
automatically updating the corresponding face data in the face database, when the data of each face in the current preview image is detected;
starting a face tracking mechanism to extend the searching space into an extended searching region according to the data including the position, size and skin color prototype of a know face in the face database, when the face classifier cannot detect a face in the searching space; and
calculating a color histogram of each position in the extended searching region and a color histogram matching of a corresponding known face, and using a data of a corresponding position with the maximum histogram matching for the detection as the detected data of each face in the current preview image.

2. The method of claim 1, further comprising the step of:
stabilizing a face rectangle that labels the face position and size, when the data of each face in the current preview image is detected.

3. The method of claim 2, wherein the stabilization process comprises the steps of:
reading the position and size information of a face rectangle in a plurality of recent preview images from the face database;
performing a median filtering to the position and size information of the face rectangle in the preview images;
perform an exponential smooth process to a median filtering result and a history data of the position and size of the known face in the face database; and labeling the median filtered and exponential smooth processed face rectangle in the corresponding face position.

4. The method of claim 3, wherein the skin color prototype is represented by a color histogram information, and the color histogram information is a color statistic value of the face position and size on the preview image.

5. A face tracking method for electronic camera devices, which is applied to an electronic camera device having a face database and a face classifier therein, wherein the face database is provided for storing data including face position, size and skin color prototype of a previously stored preview image, comprising the steps of:
obtaining a current preview image;
determining whether or not a known face exists in the face database;
defining a searching space on the current preview image;
using the face classifier to detect the searching space in the current preview image, and determining whether or not a face exists in the searching space;
defining the searching space according to the position and size of each skin color extraction area in the current preview image, when it is determined that there is no known face in the face database;
automatically updating the corresponding face data in the face database, when a data of each face in current preview image is detected; and
stabilizing a face rectangle that labels the face position and size, when the data of each face in the current preview image is detected, wherein the stabilization process comprises the steps of:
reading the position and size information of a face rectangle in a plurality of recent preview images from the face database;
performing a median filtering to the position and size information of the face rectangle in the preview images;
perform an exponential smooth process to a median filtering result and a history data of the position and size of the known face in the face database; and
labeling the median filtered and exponential smooth processed face rectangle in the corresponding face position.

6. The method of claim 5, wherein the skin color prototype is represented by a color histogram information, and the color histogram information is a color statistic value of the face position and size on the preview image.

7. A face tracking method for electronic camera devices, which is applied to an electronic camera device having a face database and a face classifier therein, wherein the face database is provided for storing data including face position, size and skin color prototype of a previously stored preview image, comprising the steps of:
obtaining a current preview image;
determining whether or not a known face exists in the face database;
defining a searching space on the current preview image;
using the face classifier to detect the searching space in the current preview image, and determining whether or not a face exists in the searching space; and
stabilizing a face rectangle that labels the face position and size, when the data of each face in the current preview image is detected, wherein the stabilization process comprises the steps of:
reading the position and size information of a face rectangle in a plurality of recent preview images from the face database;
performing a median filtering to the position and size information of the face rectangle in the preview images;
perform an exponential smooth process to a median filtering result and a history data of the position and size of the known face in the face database; and
labeling the median filtered and exponential smooth processed face rectangle in the corresponding face position.

8. The method of claim 7, wherein the skin color prototype is represented by a color histogram information, and the color histogram information is a color statistic value of the face position and size on the preview image.

* * * * *